(12) United States Patent
Cohen et al.

(10) Patent No.: US 9,934,507 B2
(45) Date of Patent: Apr. 3, 2018

(54) MAPPING USER ACTIONS TO HISTORICAL PATHS TO DETERMINE A PREDICTED ENDPOINT

(71) Applicant: International Business Machines Corporation, Armonk, NY (US)

(72) Inventors: Aaron M. Cohen, Westford, MA (US); Paul Komar, Lexington, MA (US); Shaun Ruske, Westford, MA (US); Brian C. Schimpf, Harvard, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 783 days.

(21) Appl. No.: 14/456,105

(22) Filed: Aug. 11, 2014

(65) Prior Publication Data
US 2016/0042288 A1 Feb. 11, 2016

(51) Int. Cl.
*G06F 15/18* (2006.01)
*G06Q 30/00* (2012.01)
*G06F 17/30* (2006.01)
*G06N 5/04* (2006.01)
*H04L 29/08* (2006.01)

(52) U.S. Cl.
CPC ..... *G06Q 30/016* (2013.01); *G06F 17/30864* (2013.01); *G06N 5/048* (2013.01); *H04L 67/10* (2013.01)

(58) Field of Classification Search
CPC .................................................... G06F 9/4446
USPC ......................................................... 706/11
See application file for complete search history.

(56) References Cited

U.S. PATENT DOCUMENTS

| 4,964,077 A | * | 10/1990 | Eisen | G06F 9/4446 434/118 |
| 5,239,617 A | * | 8/1993 | Gardner | G06F 9/4446 434/118 |
| 5,255,386 A | * | 10/1993 | Prager | G06F 9/4446 |
| 5,388,198 A | * | 2/1995 | Layman | G06F 9/4446 715/708 |

(Continued)

OTHER PUBLICATIONS

The development and utilization of the case-based help-desk support system HOMER, by Goker, 1999.*

(Continued)

*Primary Examiner* — Michael B Holmes
(74) *Attorney, Agent, or Firm* — Cuenot, Forsythe & Kim, LLC

(57) ABSTRACT

A first signature log generated by a first processing system is received. A first listing of the recorded series of user inputs included in the signature log is compared to at least one historical log indicating at least one historical path, each historical path including at least second listing of a series of historical user inputs that corresponds to a historical endpoint in the computer program. Responsive to comparing the first listing of the recorded series of user inputs to the at least one historical log, the historical path to which the recorded series of user inputs at least partially corresponds is identified and the at least one historical endpoint is identified as a predicted endpoint in the computer program. Based on the predicted endpoint, a predicted path corresponding to the predicted endpoint in the computer program is selected and output.

14 Claims, 4 Drawing Sheets

(56) References Cited

U.S. PATENT DOCUMENTS

| | | | | |
|---|---|---|---|---|
| 5,471,631 | A * | 11/1995 | Beardsley | G06F 11/0775 702/178 |
| 5,485,544 | A * | 1/1996 | Nonaka | G06F 9/4446 706/11 |
| 5,546,521 | A * | 8/1996 | Martinez | G06F 9/4446 715/708 |
| 6,021,403 | A * | 2/2000 | Horvitz | G06F 9/4446 706/11 |
| 6,021,437 | A * | 2/2000 | Chen | G06F 11/0709 709/202 |
| 6,340,977 | B1 * | 1/2002 | Lui | G06F 9/4446 715/706 |
| 7,225,139 | B1 * | 5/2007 | Tidwell | G06Q 10/06311 705/7.15 |
| 7,240,297 | B1 | 7/2007 | Anderson et al. | |
| 7,366,731 | B2 * | 4/2008 | Lewis | G06Q 30/02 |
| 7,539,654 | B2 * | 5/2009 | Ramaswamy | G06F 3/0481 706/20 |
| 7,757,124 | B1 * | 7/2010 | Singh | G06F 11/26 714/32 |
| 7,979,733 | B2 * | 7/2011 | Erdtmann | G06F 11/0709 709/224 |
| 8,271,950 | B2 | 9/2012 | Bharadwaj | |
| 8,438,479 | B2 * | 5/2013 | Inoue | G06F 3/04895 715/708 |
| 8,694,355 | B2 * | 4/2014 | Bui | G06N 5/022 705/7.27 |
| 8,965,949 | B2 * | 2/2015 | Thieret | G06N 5/025 708/290 |
| 9,009,609 | B2 * | 4/2015 | Schimpf | G06F 8/38 715/762 |
| 9,104,996 | B2 * | 8/2015 | Komar | G06F 9/44 |
| 9,117,187 | B2 * | 8/2015 | Frederick | G06Q 10/06311 |
| 9,135,642 | B1 * | 9/2015 | Irwin | G06Q 30/0256 |
| 9,208,164 | B2 * | 12/2015 | Clemm | G06F 17/2211 |
| 9,251,499 | B2 * | 2/2016 | Cohen | G06F 9/4446 |
| 9,262,134 | B2 * | 2/2016 | Kelapure | G06F 8/40 |
| 9,311,078 | B2 * | 4/2016 | Clemm | G06F 8/72 |
| 9,311,079 | B2 * | 4/2016 | Clemm | G06F 8/72 |
| 9,477,705 | B2 * | 10/2016 | Schimpf | G06F 17/30398 |
| 9,529,842 | B2 * | 12/2016 | Schimpf | G06F 17/30398 |
| 9,652,507 | B2 * | 5/2017 | Frankel | G06F 17/3053 |
| 9,659,066 | B2 * | 5/2017 | Frankel | G06F 17/3053 |
| 9,753,929 | B2 * | 9/2017 | Clemm | G06F 17/3007 |
| 2003/0204565 | A1 * | 10/2003 | Guo | A63F 13/12 709/205 |
| 2004/0130572 | A1 * | 7/2004 | Bala | G06F 9/4446 715/762 |
| 2005/0193004 | A1 * | 9/2005 | Cafeo | G06F 17/30368 |
| 2005/0268234 | A1 * | 12/2005 | Rossi, Jr. | G06F 9/4446 715/705 |
| 2006/0036991 | A1 * | 2/2006 | Biazetti | G06F 9/4446 717/104 |
| 2006/0126801 | A1 * | 6/2006 | Laperi | G06Q 10/06 379/32.01 |
| 2006/0155398 | A1 * | 7/2006 | Hoffberg | G05B 15/02 700/86 |
| 2007/0136667 | A1 * | 6/2007 | Gerhart | G06F 9/4446 715/705 |
| 2007/0162256 | A1 * | 7/2007 | Verma | G06F 3/015 702/182 |
| 2007/0162259 | A1 * | 7/2007 | Garrett | G06F 9/4446 702/186 |
| 2007/0174731 | A1 * | 7/2007 | Haeberle | G06F 11/0748 714/46 |
| 2007/0203712 | A1 * | 8/2007 | Sunday | G06Q 10/06 705/309 |
| 2008/0162688 | A1 * | 7/2008 | Reumann | G06F 11/0748 709/224 |
| 2008/0250316 | A1 * | 10/2008 | Zhang | G06F 9/4443 715/708 |
| 2010/0115348 | A1 * | 5/2010 | Gilluwe | G06F 17/30386 714/57 |
| 2012/0066547 | A1 * | 3/2012 | Gilbert | H04L 41/065 714/26 |
| 2014/0123228 | A1 * | 5/2014 | Brill | H04L 63/1416 726/4 |
| 2014/0317502 | A1 * | 10/2014 | Brown | G06F 9/4446 715/706 |
| 2015/0046578 | A1 * | 2/2015 | Caicedo | H04L 67/2809 709/224 |
| 2015/0169336 | A1 * | 6/2015 | Harper | G10L 15/22 715/706 |
| 2016/0210033 | A1 * | 7/2016 | Gagneraud | G06F 21/305 |
| 2016/0269553 | A1 * | 9/2016 | Huang | H04M 3/42059 |

OTHER PUBLICATIONS

Predicting stock market trends using random forests: A sample of the Zagreb stock exchange T. Manojlović; I. Štajduhar 2015 38th International Convention on Information and Communication Technology, Electronics and Microelectronics (MIPRO) Year: 2015 pp. 1189-1193 IEEE Conference Publications.*

Road friction estimation for connected vehicles using supervised machine learning Ghazaleh Panahandeh; Erik Ek; Nasser Mohammadiha 2017 IEEE Intelligent Vehicles Symposium (IV) Year: 2017 pp. 1262-1267 IEEE Conference Publications.*

Diversifying Web Service Recommendation Results via Exploring Service Usage History Guosheng Kang; Mingdong Tang; Jianxun Liu; Xiaoqing (Frank) Liu; Buqing Cao IEEE Transactions on Services Computing Year: 2016, vol. 9, Issue: 4 pp. 566-579 IEEE Journals & Magazines.*

Hyperprofile-Based Computation Offloading for Mobile Edge Networks Andrew Crutcher; Caleb Koch; Kyle Coleman; Jon Patman; Flavio Esposito; Prasad Calyam 2017 IEEE 14th International Conference on Mobile Ad Hoc and Sensor Systems (MASS) Year: 2017 pp. 525-529 IEEE Conference Publications.*

IBM: List of IBM Patents or Patent Applications Treated as Related.

Cohen et al., "Mapping User Actions to Historical Paths to Determine a Predicted Endpoint", U.S. Appl. No. 14/723,698, filed May 28, 2015, 39 pages.

IBM, "Method for Software User Training and Error Recovery, by Comparing Actual, Logged Steps to Optimal Steps," [Online] IP.com Prior Art Database, Technical Disclosure No. IPCOM000127357D, Aug. 25, 2005, 4 pg.

"Method of Identifying and Correcting User Errors during Task Flows," [Online] IP.com Prior Art Database, Technical Disclosure No. IPCOM000213410D, Dec. 14, 2011, 5 pg.

* cited by examiner

500 receive a first signature log generated by a first processing system, the first signature log being a computer readable data structure and comprising a first listing of at least a recorded series of user inputs received by a computer program
505

Compare, by a path search engine executing using a processor, the first listing of the recorded series of user inputs to at least one historical log indicating at least one historical path, each historical path comprising at least second listing of a series of historical user inputs that corresponds to a historical endpoint in the computer program
510

Responsive to comparing the first listing of the recorded series of user inputs to the at least one historical log, identify the at least one historical path to which the recorded series of user inputs at least partially corresponds and identifying the at least one historical endpoint as a predicted endpoint in the computer program
515

Select, based on the predicted endpoint, a predicted path corresponding to the predicted endpoint in the computer program, and outputting the predicted path
520

FIG. 5

MAPPING USER ACTIONS TO HISTORICAL PATHS TO DETERMINE A PREDICTED ENDPOINT

BACKGROUND

The present invention relates to user support systems, and more specifically, to support systems that help users to use computer programs.

Computer programs, such as applications, operating systems, and the like, oftentimes are very complex. Users who are new to the products typically lack knowledge required to access certain features of the products. Help menus commonly are provided, but sometimes the help menus themselves can be difficult to navigate. Moreover, help menus sometimes only cover basic features provided computer programs and lack instructions for implementing more advanced features. Sometimes a telephone number is provided which a user can call to request further assistance, either from an automated system or from a person manning a help desk. The solution to the user's inquiry, however, is not always easily obtained. Indeed, an automated system may not even be programmed to cover all potential feature implementations, and a person manning the help desk also may lack knowledge necessary to implement certain features in the manner in which the user wishes to use such features.

SUMMARY

A system includes a processor programmed to initiate executable operations. The executable operations include receiving a first signature log generated by a first processing system, the first signature log being a computer readable data structure and including a first listing of at least a recorded series of user inputs received by a computer program. The executable operations also include comparing, by a path search engine executed by the processor, the first listing of the recorded series of user inputs to at least one historical log indicating at least one historical path, each historical path including at least second listing of a series of historical user inputs that corresponds to a historical endpoint in the computer program. The executable operations also include, responsive to comparing the first listing of the recorded series of user inputs to the at least one historical log, identifying the at least one historical path to which the recorded series of user inputs at least partially corresponds and identifying the at least one historical endpoint as a predicted endpoint in the computer program. The executable operations also include, selecting, based on the predicted endpoint, a predicted path corresponding to the predicted endpoint in the computer program, and outputting the predicted path.

A computer program includes a computer readable storage medium having program code stored thereon. The program code is executable by a processor to perform a method. The method includes receiving, by the processor, a first signature log generated by a first processing system, the first signature log being a computer readable data structure and including a first listing of at least a recorded series of user inputs received by a computer program. The method also includes comparing, by a path search engine executed by the processor, the first listing of the recorded series of user inputs to at least one historical log indicating at least one historical path, each historical path including at least second listing of a series of historical user inputs that corresponds to a historical endpoint in the computer program. The method also includes, responsive to comparing the first listing of the recorded series of user inputs to the at least one historical log, identifying, by the processor, the at least one historical path to which the recorded series of user inputs at least partially corresponds and identifying the at least one historical endpoint as a predicted endpoint in the computer program. The method also includes, selecting, by the processor, based on the predicted endpoint, a predicted path corresponding to the predicted endpoint in the computer program, and outputting the predicted path.

BRIEF DESCRIPTION OF THE SEVERAL VIEWS OF THE DRAWINGS

FIG. 5 is a flow chart illustrating an example of a method of selecting a predicted path corresponding to a predicted endpoint in a computer program.

DETAILED DESCRIPTION

Figure 1:
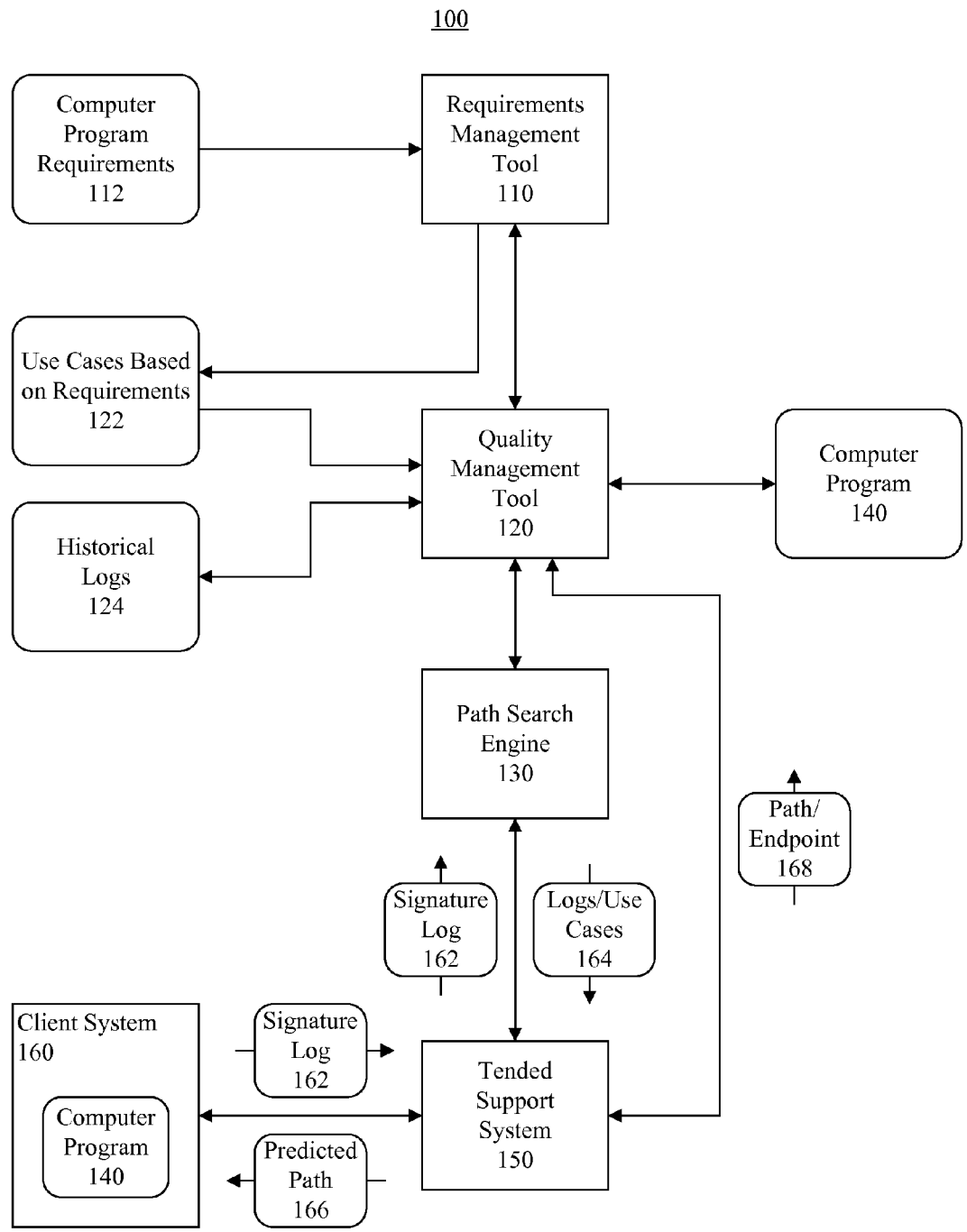
FIG. 1 is a block diagram illustrating an example of a user support system.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to user support systems, and more specifically, to support systems that help users to use computer programs. In accordance with arrangements described herein, a user of a computer program can provide a series of user inputs to the computer program attempting to access a desired task, function or process (hereinafter "endpoint") initiated by a computer program. The user inputs can be recorded by the computer program, or another application or service, in a log file. Further, triggered events (e.g., presentation of menus, etc.), calls exchanged between modules of a computer program, between a computer program and another computer program (e.g., calls between a web browser and a web application), and the like also can be recorded in the log file. The data recorded in the log file is referred to herein as a "signature." The series of user inputs provided by the user, however, may not result in the endpoint being initiated. For example, the signature may not lead to the desired endpoint. The user then may initiate a help function of the computer program or contact a support system to request help in reaching the desired endpoint.

The help function or support system can compare the present signature to a historical log containing one or more historical paths. Each historical path can include a listing of a series of historical user inputs that correspond to a historical endpoint in the computer program. Each path also can list events triggered by the user inputs, calls, and the like. In this regard, each historical path can be a signature previously recorded when a historical endpoint was accessed, for example during testing or debugging of the computer program, while a support engineer was helping another user, etc.

Responsive to comparing the present signature to the historical log, one or more historical paths to which the present signature corresponds, at least in part, can be identified and one or more historical endpoints corresponding to the identified historical paths can be identified. Further, an identifier for a predicted endpoint in the computer program can be generated. For example, based on the present signature, and its determined correspondence to a plurality of historical paths, one of the corresponding historical paths can be identified as being most relevant to the signature. The historical endpoint of that historical path can be identified, and a corresponding identifier can be generated indicating that historical endpoints as a predicted endpoint. Based on the predicted endpoint, a predicted path corresponding to the predicted endpoint can be selected, and the predicted path can be output. For example, the predicted path can be presented to the user or a support person helping the user.

Several definitions that apply throughout this document now will be presented.

As defined herein, the term processing system means a system that includes at least one processor. Examples of a processing system include, but are not limited to, a server, a workstation, a desktop computer, a mobile computer, a laptop computer, a netbook computer, a tablet computer, a smart phone, a set top box, a gaming system and an internet appliance.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "signature" means a listing of a series of events detected by, or initiated by, a computer program. For example, a signature can include a listing of a series of user inputs received by a computer program, the series of user inputs entered by a user with an intent to access a desired endpoint. Such signature also can include a listing of events, for example presentation of menu items, initiated by the computer program responsive to user inputs. The signature further can include a listing of calls between modules of the computer program, a listing of calls between the computer program and another computer program, and the like, initiated by the computer program responsive to user inputs. A signature may be stored in a log.

As defined herein, the term "path" means a signature that actually leads to a desired endpoint.

As defined herein, the term "historical path" means a path stored on a computer readable storage medium which is configured to be accessed for future processing. For example, a historical path may be contained in a historical log and may be accessed for comparison to received signature.

As defined herein, the term "user input" means an input by a user into a computer program. Examples of a user input include, but are not limited to, a user selection of one or more keys of a keyboard or keypad, a user selection of a button, a user selection of an icon, key, button, field or the like presented by a graphical user interface, a user control of a mouse, touchpad, or the like, a user selection of a menu item presented by a user interface, a user entry of information into a field presented by a user interface, and detection of a user gesture (e.g., by a sensor or touch screen).

As defined herein, the term "log" means a computer readable data structure, formatted for interpretation by a processor, in which user inputs are recorded. A log also can include a listing of events, for example presentation of menu items, initiated by a computer program responsive to the user inputs.

As defined herein, the term "historical log" means a log stored on a computer readable storage medium which is configured to be accessed for future processing.

As defined herein, the term "endpoint" means a task, function or process initiated by a computer program in response to at least one user input. In illustration, a user may enter a series of user inputs into a computer program with the intent to access a task, function or process.

As defined herein, the term "historical endpoint" means an endpoint led to by a historical path.

As defined herein, the term "predicted endpoint" means an endpoint predicted by a processing system as corresponding to a desired endpoint based on a series of user inputs received by a computer program.

As defined herein, the term "predicted path" means a path selected by a processing system that leads to a predicted endpoint.

As defined herein, the term "use case" means a set of conditions or variables used to determine whether a computer program, or a feature of the computer program, is working as intended. A use case can be, for example, a test case.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "substantially" means largely but not wholly. For example, if a signature log substantially matches a historical log, a large portion of events listed in the signature log may match events listed in the historical log, though there may not be a match for all events. Similarly, if a signature log substantially matches a historical log, each event listed in the signature log may match a corresponding event in the historical log, but the historical log also may lists additional events not listed in the signature log.

As defined herein, the term "output" means storing in memory elements, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

FIG. 1 is a block diagram illustrating an example of a user support system (hereinafter "system") 100. The system 100 can include a requirements management tool 110 and a quality management tool 120 and a path search engine 130. The requirements management tool 110, quality management tool 120 and path search engine 130 can be software modules/applications executed by a single processing system or executed among a plurality of processing systems communicatively linked via at least one network. The network is the medium used to provide communications links between various devices and data processing systems connected together within system 100. The network may include connections, such as wire, wireless communication links, or fiber optic cables. The network can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or the like.

The requirements management tool 110 can receive computer program requirements 112 for a computer program 140. The computer program requirements 112 can specify functionality expected of the computer program 140, including stated requirements the computer program 140 is to achieve. The computer program requirements 112 can be communicated to a quality management tool 120. In addition, use cases 122 (e.g., test cases) based on the computer program requirements 112 can be generated and communicated to the quality management tool 120. By way of example, one or more quality engineers can read the computer program requirements 112 and generate the use cases 122. One or more links between the computer program requirements 112 and the generated the use cases 122 can be established. Such links can indicate, for example, the status of the computer program requirements 112 with regard to the use cases 122, how many use cases 122 have been created for each computer program requirement 112, etc.

The quality management tool 120, or another application/service to which the quality management tool 120 is communicatively linked, can be accessed by one or more quality engineers to execute the use cases 122 with the computer program 140. While executing each of the use cases 122, the quality engineers can enter one or more user inputs with the goal of reaching a particular endpoint. The user inputs entered can be tracked and entered into a historical log 124 as a historical path. In addition, events triggered by the user inputs, calls, and the like can be tracked and entered into the historical log 124. In one arrangement, the computer program 140 can be instrumented with program code that generates identifiers corresponding to the user inputs, events, calls, etc., and these identifiers can be stored in the historical log. Regardless, the historical log 124 can maintain a historical signature corresponding to the testing implemented using the use case, and the historical signature can be associated with the use case in a suitable manner. For example, and identifier indicating the use case can be included in the historical log 124. Further, the endpoint that is reached by each particular set of user inputs can be indicted in the historical log 124 as a historical endpoint. The historical log 124 generated for each use case can be stored in a suitable data structure, for example in a database, data table, or the like.

The path search engine 130 can be configured to receive signatures recorded by client systems while the computer program 140 is used, and search the historical logs 124 to find historical signatures that, at least in part, match the received signatures. For example, the path search engine 130 can interface with the quality management tool 120 to access the historical logs 124, or the path search engine 130 can access the historical logs 124 directly from the data structure in which they are stored.

In illustration, a client system 160 can execute the computer program 140, or the client system 160 can access the computer program 140 via a network (e.g., if the computer program 140 is a web application or other computer program hosted remote to the client system 160). A user of the client system 160 can contact the tended support system 150 to request assistance accessing a certain feature (endpoint) of the client system 160. The tended support system 150 can be a software module/application executing on a processing system that executes the path search engine 130, or can be executed on a processing system communicatively linked to the processing system executing the path search engine 130, for example via the network. Further, the tended support system 150 can be communicatively linked to other components of the system 100, such as the quality management tool 120 and the path search engine 130, via the network.

The user can contact the tended support system 150 via e-mail, text messaging or the like implemented via the client system 160, or the user can place a telephone or video call to the tended support system 150. In this regard, the client system 160 can be communicatively linked to the tended support system 150 via a suitable network, for example network previously described. In any case, a support engineer can respond to the user's inquiry. In one arrangement, the support engineer can request that the user provide access to the computer program 140 to retrieve a signature log 162 generated in response to user inputs by the user into the computer program 140 attempting to access the feature. The user can provide the requested access and the support engineer can access the signature log 162. In another arrangement, the support engineer can instruct the user on how to send the signature log 162, and the user can send the signature log 162 to the support engineer accordingly.

The signature log 162 can be a rolling log that is continuously updated each time a user enters a user input, triggers an event/action, etc. For example, the signature log 162 can list user inputs and corresponding events/actions. For example, the signature log 162 can list a user input that triggers presentation of a menu, list user inputs selecting one or more menu items from the menu, list user inputs that initiate other events/actions in the computer program, etc. The signature log 162 can be arranged so that the user inputs and initiated events/actions are listed sequentially. The signature log 162 also can indicate a computing environment in which the computer program 140 is being used by the client system 160. For example, the signature log can indicate the operating system being used, hardware/software resources available and/or being used to execute the computer program 140, etc. In the case that the computer program 140 is a web application, the web browser executing on the client system 160 to access the computer program 140, plugins, and the like, also can be indicated in the signature log 162. Accordingly, the signature log 162 can be readily compared to historical paths to determine which historical path(s) correspond to the computing environment in which the computer program 140 is being used, and the endpoint the user desires to access.

In one aspect, the tended support system 150 or support engineer can parse from the signature log 162 the most recent user inputs, actions/events, etc. and include only the parsed items in the version of the signature log 162 communicated to the path search engine 130. For example, the parsed items can be those user inputs, actions/events, etc. beginning with a user selection of a primary menu item in the computer program 140, for instance a menu item presented by a main menu of the computer program 140.

Via the tended support system 150, the engineer can open a support ticket with the system 100, for example with the quality management tool 120, and communicate the signature log 162 to the path search engine 130. The signature log 162 can be associated with the support ticket in a suitable manner. For example, when sending the signature log 162 to the path search engine 130, the tended support system 150 can append to the signature log 162 an identifier corresponding to the support ticket.

The path search engine 130 can automatically compare the signature log 162 to historical logs 124 to identify one or more historical logs 124 that match, at least in part, the signature log 162. In this regard, because the user was not able to access the desired feature (endpoint), it may be the case that the signature log 162 does not precisely match any of the historical logs 124, or if the signature log 162 does precisely match a particular historical log 124, the endpoint associated with the historical log 124 may not be the user's desired endpoint. Moreover, a user may have started down the appropriate path to reach the desired endpoint, but may be unsure as to a next user input/selection that is required to continue along that path to reach the desired endpoint. Thus, even if the signature log 162 does precisely match a particular historical log 124, the path search engine 130 can identify not only that particular historical log 124, but also one or more other historical logs 124 which at least partially match the signature log 162. For instance, the path search engine 130 can identify one or more other historical logs 124 that match, at least in part, the signature log 162.

In illustration, if a historical log 124 includes a path of seven user inputs that access a particular endpoint, and the signature log 162 lists the first five of those user inputs as recently being entered by the user, that historical log 124 can be selected as potentially corresponding to the user's desired endpoint. Similarly, if all but a small number of the user inputs recently entered by the user match the path of the historical log 124, that historical log 124 can be selected as potentially corresponding to the user's desired endpoint. For example, the user may have entered a number of appropriate user selections, but inadvertently selected an incorrect menu item along the way.

The path search engine 130 can, in real time, identify the use cases 122 corresponding to the identified historical log(s) 124, and communicate the identified historical logs 164 and corresponding use cases to the tended support system 150. If any of the identified historical logs 164 indicate corresponding support tickets (e.g., support tickets corresponding to use cases associated with the historical logs 164), those support tickets also can be communicated to the tended support system 150 for presentation to the support engineer. Based on interactions with the user, the support engineer can determine what feature (endpoint) of the computer program 140 the user is attempting to access. For example, the support engineer can ask the user "what are you trying to accomplish?" The support engineer can review the use cases and support tickets, if any, to determine whether any of the use cases actually reach the endpoint the user is trying to reach. If so, the support engineer can review the corresponding historical log and explain to the user how to reach that endpoint, or initiate communication, from the tended support system 150 to the client system 160, a predicted path 166 the user can follow to reach the desired endpoint.

In one arrangement, for each identified historical log 164, the path search engine 130 can identify a deviation between the signature log 162 and the historical log 164. Such deviation can be, for example, user inputs listed in the historical log 164 that are not listed in the signature log 162, user inputs listed in the signature log 162 that are not listed in the historical log 164, and the like. The deviation can help the support engineer to identify incorrect or missing user inputs preventing the user from accessing the desired endpoint. They support engineer can convey such information to the user.

In some cases, there may not be a use case 122 which arrives at the desired endpoint. Nonetheless, based on the use cases that are identified, the support engineer can attempt to determine an appropriate path to arrive at the desired endpoint. If the support engineer is able to determine an appropriate path, the support engineer can explain the path to the user. The support engineer also can initiate, via the tended support system 150, recording of user inputs by the support engineer into the computer program 140, as well as other events corresponding to the user inputs. When the support engineer has arrived at the desired endpoint, the support engineer can stop the recording. The recording can be processed by the tended support system 150 to determine the appropriate path (new path), for reaching the desired endpoint, and the support engineer can initiate communication of such path to the user, or instruct the user how to follow the new path.

Further, the new path and corresponding endpoint can be communicated from the tended support system 150 to the quality management tool 120, for example in a new signature log. A corresponding support ticket also can be communicated to the quality management tool 120. The quality management tool 120 can generate a new historical log including the new path, as a historical path, leading to the desired endpoint, and store the new historical log with the other historical logs 124 for future reference. An identifier can be added to the new historical log 124 to indicate an association (e.g., a link) between the new path and the corresponding (desired) endpoint. An identifier also can be added to the newly generated historical log 124 to indicate an association (e.g., a link) between the new path and the support ticket generated for the present help session. Thus, if the historical log 124, or the new use case, is accessed as some future point in time to help another user, the support ticket can be presented to the support engineer or the user. The support ticket can provide specific information regarding the first user's issue, and may include statements by the first user as to what issue the first user encountered.

Moreover, a corresponding use case can be automatically generated and stored with the use cases 122. The use case can, for example, identify the corresponding endpoint and indicate the functionality provided by the endpoint. The use case also can provide instructions on how to follow the intended path. Thus, if other users contact the support system 150, and their signature logs match, at least in part (e.g., substantially), the generated historical path, the corresponding use case can be included with the use cases identified by the path search engine 130. In this regard, the present operations can create a linkage between support tickets and use cases 122, as well as requirements upon which use cases 122 are generated. Accordingly, support engineers and/or users can retrieve use cases 122, as well as associated requirements, corresponding to support tickets, and support engineers and/or users can retrieve support tickets corresponding to use cases 122. This linkage can greatly enhance operation of the system 100, improving support provided to users.

In one arrangement, the signature log 162 can indicate user inputs, actions/events, etc. that define a path that should lead to the desired endpoint, but does not due to some defect (e.g., bug) in the computer program 140. The path/point information 168 communicated to the quality management tool 120 can indicate such defect. Based on such indication, the quality management tool 120 can automatically generate a defect notification and communicate that notification to a system (not shown) that tracks software defects, and a corrective action notification can be generated. Further, the support engineer can work with the user to find an alternate path to the desired endpoint. If such alternate path is found, the path/endpoint 168 information for that path also can be communicated to the quality management tool 120. Further, the corresponding support ticket generated for the present issue can include notes and/or statements by the user and/or support engineer regarding the issue being resolved, including what user inputs, events/actions, etc. were tried, specific problems/error messages encountered, etc.

Figure 2:
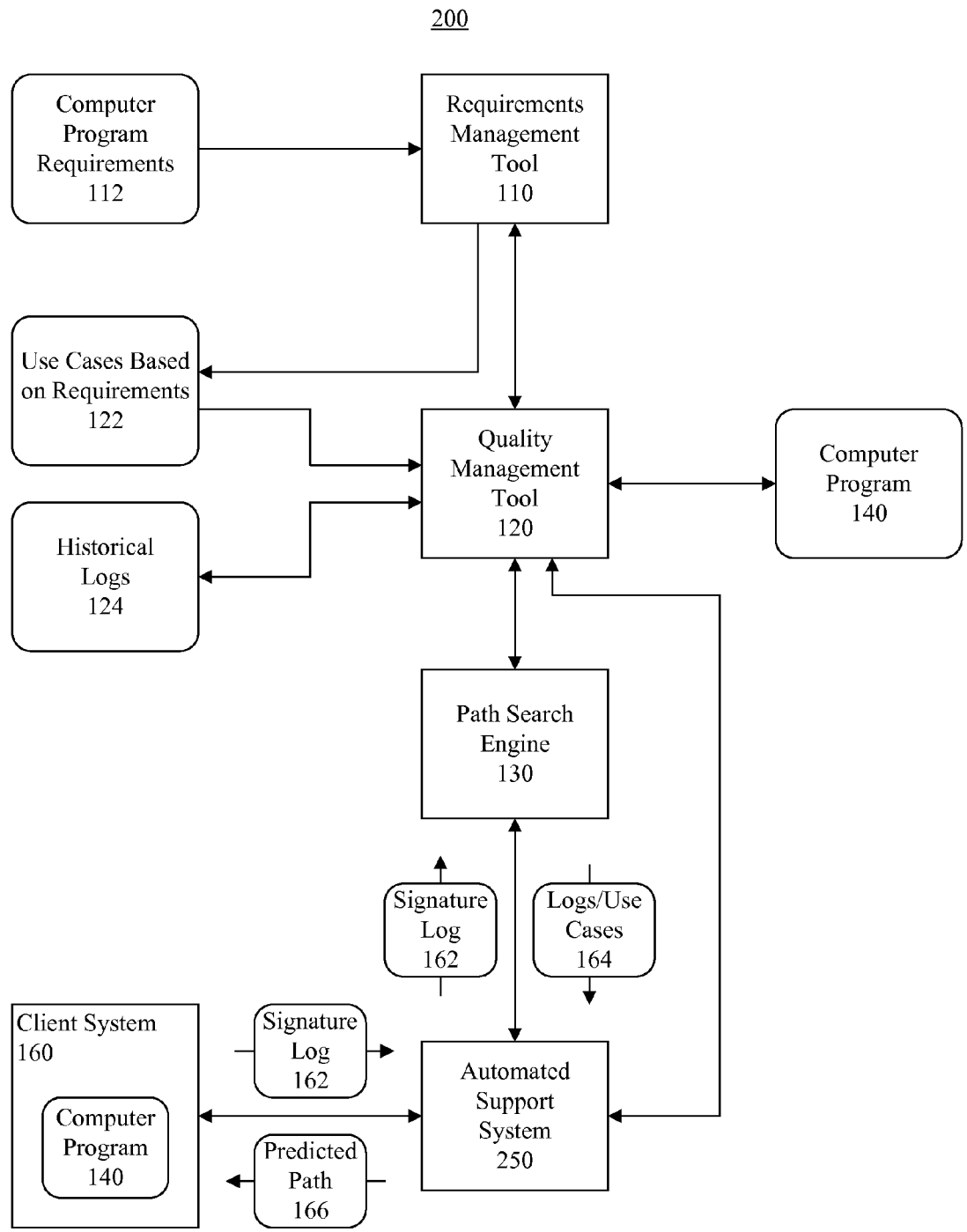
FIG. 2 is a block diagram illustrating another example of a user support system.

FIG. 2 is a block diagram illustrating another example of a user support system 200. In FIG. 2, rather than the client system 160 or user contacting the tended support system 150 of FIG. 1, the user and/or client system 160 can contact an automated support system 250. Again, the automated support system 250 can be a software module/application executing on a processing system that executes the path search engine 130, or can be executed on a processing system communicatively linked to the processing system executing the path search engine 130, for example via the network. Further, the automated support system 250 can be communicatively linked to other components of the system 200, such as the quality management tool 120 and the path search engine 130, via the network. Also, the client system 160 can be communicatively linked to the automated support system 250 a suitable network, such as that previously described.

In operation, the user/client system 160 can contact the automated support system 250 via a help menu presented by the computer program 140, via a web page presented by the automated support system 250 accessed by the user/client system 160, or the user/client system 160 can contact the automated support system 250 in any other suitable manner. The system 200 can implement the functions/processes previously described for FIG. 1, though the automated support system 250 can automatically implement functions previously described. In one arrangement, the automated support system 250 can prompt the user/client system 160 to communicate the signature log 162 to the automated support system 250. In another arrangement, the computer program 140, or another application or service, can communicate the signature log 162 to the automated support system 250.

In one aspect, when a plurality of logs/use cases 164 are identified by the path search engine 130 responsive to processing the signature log 162, the path search engine 130 can communicate to the automated support system 250 the identified historical logs/use cases 164. Each historical log can identify a historical endpoint to which the use case corresponds. From among the identified historical logs/use cases 164, the automated support system 250 can select one of the historical logs 164 that most closely matches the signature log 162. The automated support system 250 then can communicate with the client system 160 to present a message to a user, for example via the user interface of the client system 160, indicating the corresponding use case and prompting the user to enter a user input indicating whether that use case corresponds to the user's desired endpoint. The historical endpoint corresponding to the historical log 124/use case can be identified as a predicted endpoint since that endpoint is identified by comparing the signature log 162 to the historical logs 124.

By way example, if the use case corresponding to the historical log is configured to set up a new project team in a repository, the message can state "Based on your recent actions you may be trying to setup a new project team in the repository. Is that correct?" Buttons or icons corresponding to "Yes" and "No" also can be presented with the message. If the user selects the "Yes" button, the automated support system 250 can identify the corresponding predicted endpoint and select the predicted path 166 that is followed to arrive at the predicted endpoint. The automated support system 250 can communicate to the client. In this regard, the predicted path 166 can include instructions (e.g., guidance) for accessing the predicted endpoint. For example, the predicted path 166 can include a statement "You need to establish a connection to the database before you can take this action." Optionally, the predicted path 166 can include, or provide a link to, instructions that explain how to make the connection to the database. In another aspect, the automated support system 250 can access user permissions corresponding to the user of the client system 160 and, based on the user permissions, determine whether the user has the necessary privileges to implement the actions/events indicted by the predicted path 166. For instance, if a connection to a database is required, the automated support system 250 can determine whether the user is assigned the privileges necessary to establish the connection to the database. If not, the message presented to the user can state, for example, "You do not have the required permissions to do this, you need Admin privilege on the project area."

If the user selects the "No" button, the automated support system 250 can select a historical log 164 that next closely matches the signature log 162. The automated support system 250 can again present, via the client system 160, a corresponding message to the user asking the user whether the use case corresponding to that historical log 164 corresponds to the user's desired endpoint, and prompting the user for a response. Again, based on the user's input, a next course of action can be implemented. This process can continue until the user selects "Yes" for a particular use case, or all use cases corresponding to the identified historical logs 164 have been presented to the user. In another arrangement, each of the use cases can be presented to the user in a message, and the user can be prompted to select one of the use cases or select a button or icon indicating that none of the use cases correspond to the desired endpoint. Again, if the user selects a particular use case, the corresponding historical endpoint can be identified as a predicted endpoint, and the predicted path 166 to arrive at the predicted endpoint can be selected and communicated to the user/client system 160.

If the user has indicted that none of such use cases corresponds to the desired endpoint, the automated support system 250 can escalate the user's inquiry. For example, the automated support system 250 can transfer the inquiry to the tended support system 150 of FIG. 1, and a support engineer can interact with the user to attempt to guide the user to the desired endpoint. Again, if the support engineer finds a suitable path to the endpoint, that path/endpoint 168 (FIG. 1) can be communicated to the quality management tool 120, as previously described.

In one arrangement, the signature log 162 can indicate a path that should be valid, but is not valid due to a defect in the computer program 140. Based on the historical logs 124, the path search engine 130 can identify the endpoint that should correspond to the signature log 162, and select another path/use case that arrives at the same endpoint. The path search engine 130 can communicate the other path/use case to the automated support system 250. Based on the other path/use case, the automated support system 250 can communicate the predicted path 166 to the user/client system 160 as an alternate path the user should use to reach the desired endpoint. Moreover, the historical log 124 that corresponds to the signature log 162 can identify a support ticket corresponding to an instance when it was discovered that the path that should be valid was discovered to be invalid due to the software defect. The path search engine 130 can communicate that support ticket to the automated support system 250, which can communicate the support ticket, or a portion thereof, to the user/client system 160. The user can evaluate the support ticket to determine a further course of action to access the desired endpoint.

Figure 3:
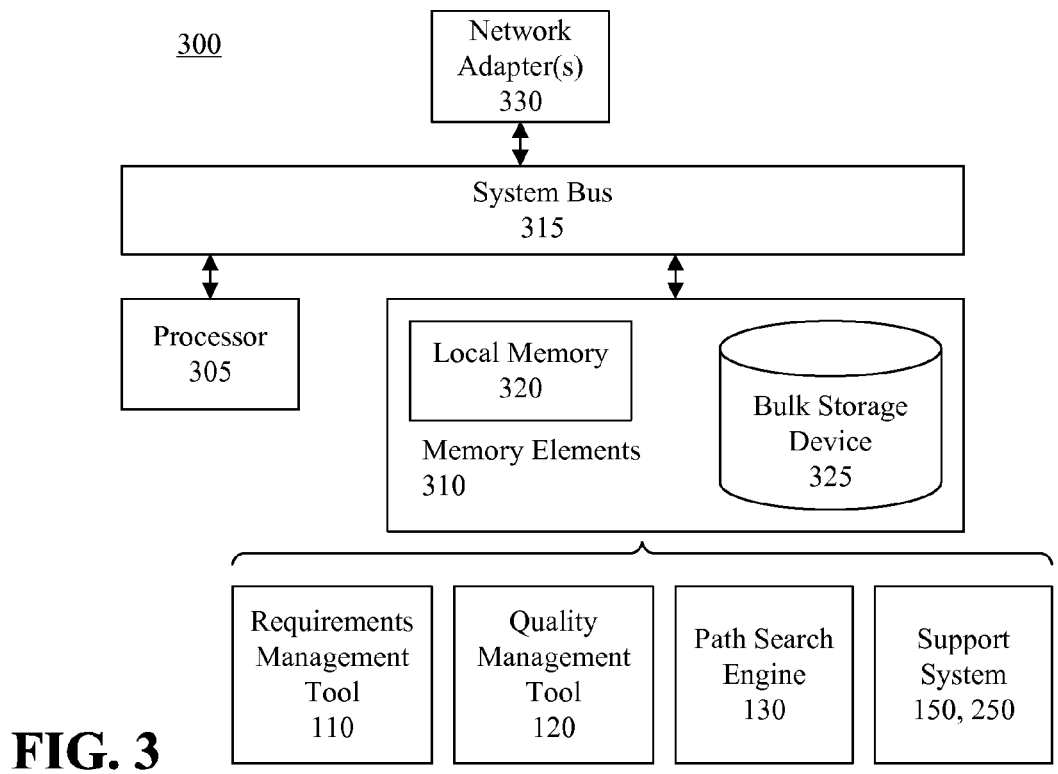
FIG. 3 is a block diagram illustrating example architecture for a processing system executing one or more modules/applications of the user support system of FIG. 1.

FIG. 3 is a block diagram illustrating example architecture for a processing system 300 executing one or more modules/applications of the user support system 100 of FIG. 1. The processing system 300 can include at least one processor 305 (e.g., a central processing unit) coupled to memory elements 310 through a system bus 315 or other suitable circuitry. As such, the processing system 300 can store program code within the memory elements 310. The processor 305 can execute the program code accessed from the memory elements 310 via the system bus 315. It should be appreciated that the processing system 300 can be implemented in the form of any system including a processor and memory that is capable of performing the functions and/or operations described within this specification. For example, the processing system 300 can be implemented as a server.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The processing system 300 also can include one or more cache memories (not shown) that provide temporary storage of at least some program code in order to reduce the number of times program code must be retrieved from the bulk storage device 325 during execution.

One or more network adapters 330 also can be coupled to processing system 300 to enable processing system 300 to become coupled to other systems, computer systems, remote printers, and/or remote storage devices through intervening private or public networks. Modems, cable modems, transceivers, and Ethernet cards are examples of different types of network adapters 330 that can be used with the processing system 300.

As pictured in FIG. 3, the memory elements 310 can store the components of the system 100 of FIG. 1, namely the requirements management tool 110, the quality management tool 120, the path search engine 130 and the tended support system 150. The memory elements also can store the automated support system 250 of FIG. 2. Being implemented in the form of executable program code, these components of the processing system 300 (or system 200) can be executed by the processing system 300 and, as such, can be considered part of the processing system 300. Moreover, the requirements management tool 110, the quality management tool 120, the path search engine 130 and the support system(s) 150, 250, including any parameters, data and/or attributes utilized by such components, are functional data structures that impart functionality when employed as part of the processing system 300 of FIG. 3.

As noted, however, it is not necessary that the requirements management tool 110, the quality management tool 120, the path search engine 130 and the support system(s) 150, 250 each be executed on the same processing system 300. In this regard, the processing system 300 can execute one or more of these components 110, 120, 130, 150, 250, and one or more other processing systems can execute other components.

Figure 4:
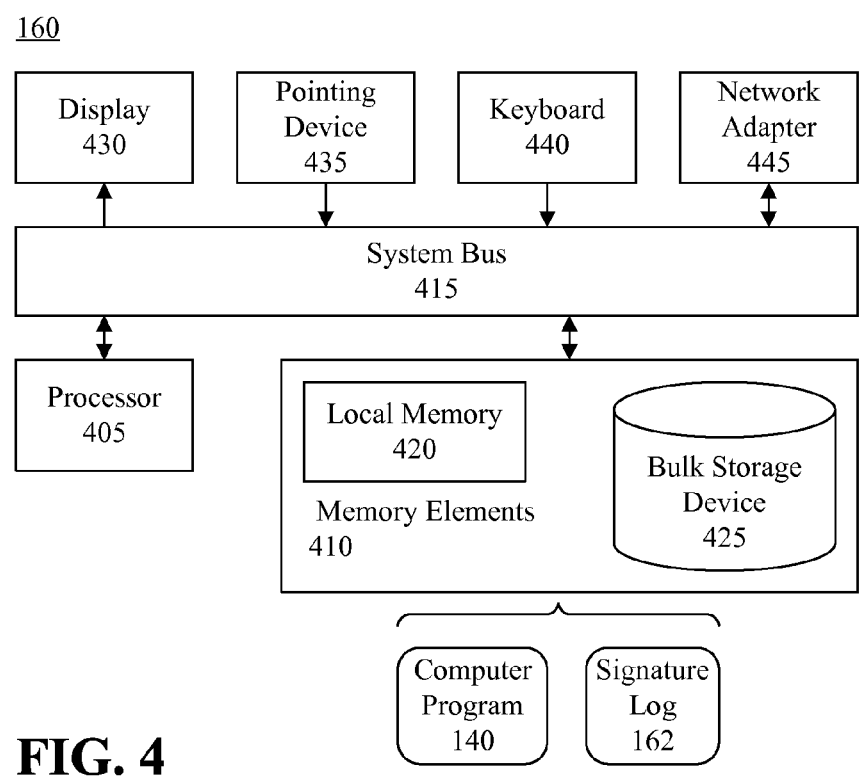
FIG. 4 is a block diagram illustrating example architecture for a client system.

FIG. 4 is a block diagram illustrating example architecture for a client system 160. The client system 160 can include at least one processor 405 (e.g., a central processing unit) coupled to memory elements 410 through a system bus 415 or other suitable circuitry. As such, the client system 160 can store program code within the memory elements 410. The processor 405 can execute the program code accessed from the memory elements 410 via the system bus 415. It should be appreciated that the client system 160 can be implemented in the form of any system including a processor and memory that is capable of performing the functions and/or operations described within this specification. For example, the client system 160 can be implemented as a computer, a workstation, a mobile computer, a laptop computer, a tablet computer, a smart phone, a personal digital assistant, a gaming device, an appliance, and so on.

The memory elements 410 can include one or more physical memory devices such as, for example, local memory 420 and one or more bulk storage devices 425. The client system 160 also can include one or more cache memories (not shown) that provide temporary storage of at least some program code in order to reduce the number of times program code must be retrieved from the bulk storage device 425 during execution.

Input/output (I/O) devices such as a display 430, a pointing device 435 and, optionally, a keyboard 440 can be coupled to the client system 160. The I/O devices can be coupled to the client system 160 either directly or through intervening I/O controllers. For example, the display 430 can be coupled to the client system 160 via a graphics processing unit (GPU), which may be a component of the processor 405 or a discrete device. One or more network adapters 445 also can be coupled to client system 160 to enable client system 160 to become coupled to other systems, computer systems, remote printers, and/or remote storage devices through intervening private or public networks. Modems, cable modems, transceivers, and Ethernet cards are examples of different types of network adapters 445 that can be used with the client system 160.

As pictured in FIG. 4, the memory elements 410 can store the computer program 140 (e.g., an instance of the computer program 140 being used by the client system 160). In another arrangement, rather than storing the computer program 140, the memory elements 410 can store a web browser or other suitable application configured to access the computer program 140 from a remote system. For example, the computer program 140 can be a web application accessed by the client system 160. Being implemented in the form of executable program code, these components of the client system 160 can be executed by the client system 160 and, as such, can be considered part of the client system 160. Moreover, the signature log 162 generated by the client system 160 is a functional data structure that imparts functionality when employed as part of the systems 100, 200 of FIGS. 1 and 2.

FIG. 5 is a flow chart illustrating an example of a method 500 of selecting a predicted path corresponding to a predicted endpoint in a computer program. At step 505, a first signature generated by a first processing system can be received. The first signature log is a computer readable data structure and includes a first listing of at least a recorded series of user inputs received by a computer program. At step 510, a path search engine executed using a processor can compare the recorded series of user inputs to at least one historical log indicating at least one historical path. Each historical path includes at least second listing of a series of historical user inputs that corresponds to a historical endpoint in the computer program. At step 515, responsive to comparing the first listing of the recorded series of user inputs to the at least one historical log, at least one historical path to which the recorded series of user inputs at least partially corresponds can be identified. The least one historical endpoint can be identified as a predicted endpoint in the computer program. At step 520, a predicted path corresponding to the predicted endpoint in the computer program can be selected based on the predicted endpoint. The predicted path can be output. For instance, the predicted path can be output for presentation to a user.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a processor programmed to initiate executable operations comprising:
    receiving a first signature log generated by a first processing system, the first signature log being a computer readable data structure and comprising a first listing of at least a recorded series of user inputs received by a computer program;
    comparing the first listing of the recorded series of user inputs to at least one historical log indicating at least one historical path, each historical path comprising at least second listing of a series of historical user inputs that corresponds to a historical endpoint in the computer program;
    responsive to comparing the first listing of the recorded series of user inputs to the at least one historical log, identifying the at least one historical path to which the recorded series of user inputs at least partially corresponds and identifying the at least one historical endpoint as a predicted endpoint in the computer program; and
    selecting, based on the predicted endpoint, a predicted path corresponding to the predicted endpoint in the computer program, and outputting the predicted path.

2. The system of claim 1, the executable operations further comprising:
    presenting to a user a plurality of use cases, each use case corresponding to a corresponding identified historical path;
    receiving from the user a selection of one of the plurality of use cases; and
    responsive to receiving from the user the selection of one of the plurality of use cases, identifying the historical endpoint corresponding to the selected use case as the predicted endpoint in the computer program.

3. The system of claim 1, the executable operations further comprising:
    identifying requirements the computer program is to satisfy;
    receiving at least a portion of the plurality of use cases generated based on the requirements the computer program is to satisfy; and
    generating a plurality of historical logs, each of the plurality of historical logs based on a respective one of the generated plurality of use cases.

4. The system of claim 3, the executable operations further comprising:
    generating a support ticket associated with the first signature log; and creating, in at least one of the historical logs, an association between the support ticket and the respective one of the generated plurality of use cases;

wherein, based on the created association, the support ticket is presented to a user or a support engineer accessing the historical log or the respective use case.

5. The system of claim 3, the executable operations further comprising:

generating a support ticket associated with the first signature log; and creating, in at least one of the historical logs, an association between the support ticket and the respective one of the generated plurality of use cases;

wherein, based on the created association, the historical log, including the respective use case, is presented to a user or a support engineer accessing the support ticket.

6. The system of claim 1, the executable operations further comprising:

responsive to a determination that the predicted endpoint does not correspond to a desired endpoint, receiving a new signature log comprising a new path corresponding to the desired endpoint;

generating a new historical log indicating the new path and the desired endpoint; and storing the new historical log as a computer readable data structure.

7. The system of claim 6, the executable operations further comprising:

generating a support ticket associated with the first signature log;

automatically generating a new use case based on the new path and the desired endpoint; and creating, in the new historical log, an association between the support ticket and the new use case;

wherein, based on the created association, the support ticket is presented to a user or a support engineer accessing the new historical log or the new use case.

8. A computer program product comprising a computer readable storage medium having program code stored thereon, the program code executable by a processor to perform a method comprising:

receiving, by the processor, a first signature log generated by a first processing system, the first signature log being a computer readable data structure and comprising a first listing of at least a recorded series of user inputs received by a computer program;

comparing, by the processor, the first listing of the recorded series of user inputs to at least one historical log indicating at least one historical path, each historical path comprising at least second listing of a series of historical user inputs that corresponds to a historical endpoint in the computer program;

responsive to comparing the first listing of the recorded series of user inputs to the at least one historical log, identifying, by the processor, the at least one historical path to which the recorded series of user inputs at least partially corresponds and identifying the at least one historical endpoint as a predicted endpoint in the computer program; and selecting, by the processor, based on the predicted endpoint, a predicted path corresponding to the predicted endpoint in the computer program, and outputting, by the processor, the predicted path.

9. The computer program product of claim 8, the method further comprising:

presenting to a user a plurality of use cases, each use case corresponding to a corresponding identified historical path;

receiving from the user a selection of one of the plurality of use cases; and responsive to receiving from the user the selection of one of the plurality of use cases, identifying the historical endpoint corresponding to the selected use case as the predicted endpoint in the computer program.

10. The computer program product of claim 8, the method further comprising:

identifying requirements the computer program is to satisfy;

receiving at least a portion of the plurality of use cases generated based on the requirements the computer program is to satisfy; and generating a plurality of historical logs, each of the plurality of historical logs based on a respective one of the generated plurality of use cases.

11. The computer program product of claim 10, the method further comprising:

generating a support ticket associated with the first signature log; and creating, in at least one of the historical logs, an association between the support ticket and the respective one of the generated plurality of use cases;

wherein, based on the created association, the support ticket is presented to a user or a support engineer accessing the historical log or the respective use case.

12. The computer program product of claim 8, the method further comprising:

generating a support ticket associated with the first signature log; and creating, in at least one of the historical logs, an association between the support ticket and the respective one of the generated plurality of use cases;

wherein, based on the created association, the historical log, including the respective use case, is presented to a user or a support engineer accessing the support ticket.

13. The computer program product of claim 8, the method further comprising:

responsive to a determination that the predicted endpoint does not correspond to a desired endpoint, receiving a new signature log comprising a new path corresponding to the desired endpoint;

generating a new historical log indicating the new path and the desired endpoint; and storing the new historical log as a computer readable data structure.

14. The computer program product of claim 13, the method further comprising:

generating a support ticket associated with the first signature log;

automatically generating a new use case based on the new path and the desired endpoint; and creating, in the new historical log, an association between the support ticket and the new use case;

wherein, based on the created association, the support ticket is presented to a user or a support engineer accessing the new historical log or the new use case.

* * * * *